J. O. PARKER.
SOLDER HEATING TOOL.
APPLICATION FILED OCT. 14, 1916.

1,224,011.

Patented Apr. 24, 1917.

Witnesses
J. H. Crawford
J. Simpking

Inventor
J. O. Parker,
By Victor J. Evans
Attorney

UNITED STATES PATENT OFFICE.

JAMES O. PARKER, OF LAKIN, KANSAS.

SOLDER-HEATING TOOL.

1,224,011.　　　　Specification of Letters Patent.　　Patented Apr. 24, 1917.

Application filed October 14, 1916. Serial No. 125,645.

*To all whom it may concern:*

Be it known that I, JAMES O. PARKER, a citizen of the United States, residing at Lakin, in the county of Kearny and State of Kansas, have invented new and useful Improvements in Solder-Heating Tools, of which the following is a specification.

The present invention is directed to a tool, and more particularly to a solder heating tool.

The primary object of the invention resides in the provision of a tool of the above stated character embodying a focusing lens adjustably mounted on the tool with relation to a vessel adapted to contain a predetermined quantity of solder to be heated, whereby when the weather conditions are such that the rays of sun are available, the focusing lens will concentrate the rays of sun on the solder and tend to present the solder in a molten or liquid state.

Another object of the invention is the production of a device of the above stated character possessing simple and few parts, and may be manufactured and sold at a minimum cost.

With the above and other objects in view, the invention consists in the novel features, details of construction and combination of parts which will hereinafter be more fully set forth, illustrated in the accompanying drawing and pointed out in the appended claims.

Figure 1:
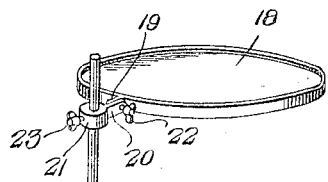
Figure 1 is a perspective view of the invention.
Figure 2:
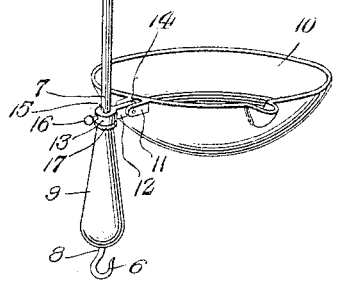
Fig. 2 is a perspective view of the focusing lens removed from the tool.
Figure 2:
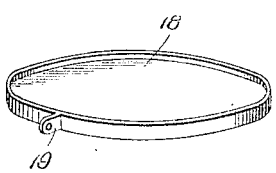
Figure 3:
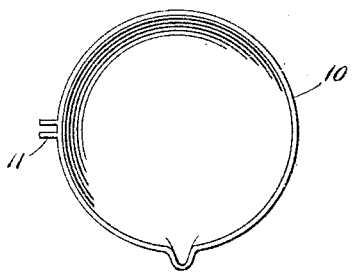
Fig. 3 is a top plan view of the cup removed from said tool.

Referring more particularly to the accompanying drawing, 5 denotes the shank of the tool provided with a lower hooked end 6 whereby the tool may be suspended on a support or the like, not shown, when the use of the tool is undesired. The point of formation of the hook with the stem 7 of the shank is abruptly offset to present a shoulder 8 on which reposes a handle 9 when the said handle is adjusted on the shank 5 to assume an active position. The character 10 denotes a container of substantially cup-shape and provided at its rear end with spaced apertured ears 11 between which the laterally extending lug 12 of the collar 13 is positioned. A pin 14 passes through the spaced apertured ears 11 of the receptacle and through the lug 12 of the collar 13, thus serving to pivotally connect the container with said collar for movement in a longitudinal plane with respect to the shank 5. This collar 13 is formed with an axial bore 15 through which the shank 5 passes, and supports the container 10 thereon for vertical sliding movement. In order that this container may be adjusted at various points throughout the length of the shank 5, use is made of a set screw 16 threadedly mounted in the collar 13 and adapted to impinge against the shank 5 when it is desired to lock the container on the shank against either sliding or rotary movements. For the purpose of illustration, however, the collar 13 is shown as reposing upon the flat upper end 17 of the handle.

Slidably and rotatably mounted upon the shank 5 at a point above the container 10 is a focusing lens 18 provided with a laterally apertured extension 19 pivotally connected to the laterally extending arm 20 of the sleeve 21, through the medium of a thumb screw 22. This sleeve is adjustably supported on the rod by means of a thumb screw 23.

The cup-formed container 10 is adapted to contain a predetermined quantity of solder to be heated, and the cup is so positioned with respect to the focusing lens 18 to permit the rays of sun to be directed and focused upon the solder, thus producing sufficient heating of the solder. It is to be further stated that the spaced apertured ears 11 of the container frictionally bind against the lug 12 of the collar, thus permitting of the cup being tilted and retained at various angles to readily permit the rays of sun concentrated through the focusing lens to be directed on the solder contained in the container.

From the foregoing description, taken in connection with the accompanying drawing, the advantages of construction and the method of operation will be readily apparent to those skilled in the art to which the invention relates, and while I have described the principles of operation of the invention, together with the device which I now consider to be the best embodiment thereof, I desire to have it understood that the device shown is merely illustrative, and that such changes may be made when desired as are within the scope of the appended claims.

What is claimed as new, is:

1. A tool of the character set forth comprising a shank, a handle thereon, a container on said shank, and a focusing lens on the shank at a point above the container for concentrating the rays of sun on the contents of said container.

2. A tool of the character set forth comprising a shank, a handle mounted upon one end of said shank, a collar on said shank, a container pivotally mounted to said collar, and a focusing lens adjustably mounted on the shank with respect to the said container, substantially as and for the purpose specified.

3. A tool of the character set forth comprising a shank, a handle at one end of said shank, a collar adjustably mounted on the shank and provided with a lug, a container provided with spaced ears, means passing through the ears of the container and through the lug of the collar for pivotally connecting the container to said collar, and a focusing lens adjustably and rotatably supported on said shank and capable of adjustment toward or away from said container, substantially as and for the purpose specified.

In testimony whereof I affix my signature.

JAMES O. PARKER.

Copies of this patent may be obtained for five cents each, by addressing the "Commissioner of Patents, Washington, D. C."